June 4, 1929.  W. J. GAGNON  1,716,267

ATTACHMENT FOR BALL CHAINS

Filed June 15, 1928

INVENTOR
WILLIAM J. GAGNON
by his attorneys
Howson and Howson

Patented June 4, 1929.

1,716,267

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

ATTACHMENT FOR BALL CHAINS.

Application filed June 15, 1928. Serial No. 285,775.

My invention relates to attachments for ball chains particularly such attachments as may be connected to the ends of ball chains, in order that other parts may be thereby attached to the chain, or in order that a pull may be conveniently given to the chain end.

In the past, similar parts have been designed which were variously constructed, being usually permanently connected to a chain end; but attachments constructed in accordance with the present invention have certain marked advantages over prior constructions, in that they are simpler, easily attached and detached, and exert a spring action upon the end of the chain which tends to keep the attachment in place.

In the accompanying drawings—

Briefly my invention consists in forming a loop of wire, as a ring or a hook, giving opposite turns to the two ends of the loop, and so shaping the wire between the loop and the turns as to cause the two turns to resist springing apart.

Figure 2:
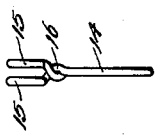
Fig. 2 is a view of the form illustrated in Figure 1, as seen from the left.
Figure 4:
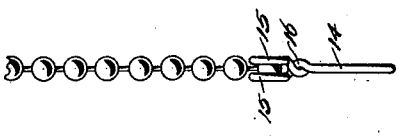
Fig. 4 is a view of Fig. 3 as seen from the left.
Figure 1:
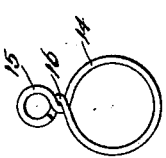
Figure 1 illustrates one form of the invention.
Figure 3:
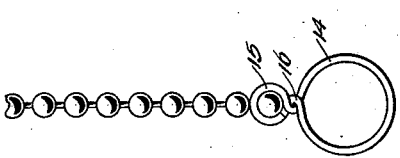
Fig. 3 shows the form illustrated in Figure 1 when attached to a chain end.

Referring more particularly to Figs. 1 to 4 inclusive, a loop 14 is formed from a single piece of wire in the shape of a ring. The ends of the wire are given opposite parallel turns 15. The wire between the ring 14 and the turns 15 is crossed in the form of a twist as shown at 16, so that the turns 15 stand apart a short distance. This distance is appreciably less than the diameter of a chain ball.

If, now, a chain ball be forced, between the two turns 15, the latter will be forced apart only from the twist 16 as a centre. The resiliency of the wire of which the two attachments is formed, will thus cause a strong resistance to be offered to the insertion of a ball between the two ball-receiving turns 15, and to the removal of the ball after insertion. Thus when a pull is exerted upon the ring 14, it will be exceedingly difficult to pull the attachment off of the chain end because of the stiffness of the wire and the short lever arm between the twist 16 and the opposite parts of the ball-receiving turns 15.

Instead of inserting the chain ball between the turns by hand as has just been indicated, I may first spread the turns with a tool, then insert the ball, and finally force the turns together around the ball in a press. Thus the connection may be made detachable or not, depending upon the class of service in which it is to be used, the gauge of wire employed, etc.

Figure 8:
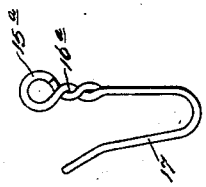
Fig. 8 is a view of Fig. 7 as seen from the left.
Figure 6:
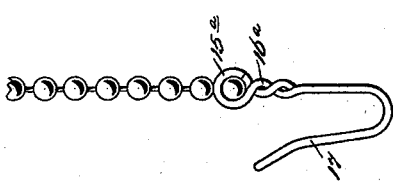
Fig. 6 is a view of Fig. 5 as seen from the left.
Figure 5:
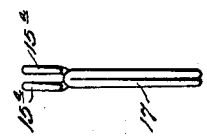
Fig. 5 illustrates another form of the invention.
Figure 7:
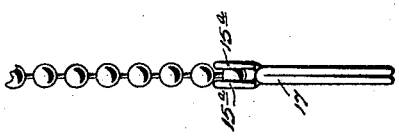
Fig. 7 shows the form illustrated in Fig. 5 when attached to a chain end.

Figs. 5, 6, 7 and 8 illustrate a hook 17 formed according to the same principle having a double twist $16^a$ formed between the hook proper and ball-receiving turns $15^a$. Here the loop is given the form of a hook of double wire, which increases its stiffness.

Figure 10:
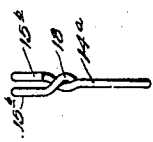
Fig. 10 is a view of Fig. 9 when turned horizontally through 90°.
Figure 12:
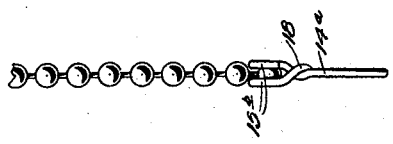
Fig. 12 is a view of Fig. 11 as seen from the left.
Figure 9:
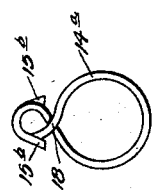
Fig. 9 is another form of the invention.
Figure 11:
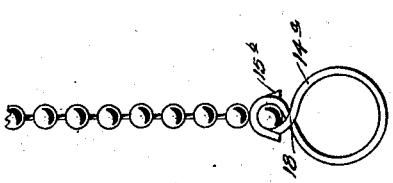
Fig. 11 shows the form illustrated in Fig. 9 when attached to a chain end.

Another form is illustrated in Figs. 9, 10, 11, and 12. In this form a ring $14^a$ is constructed of a single piece of wire, and it is preferred to give the ball-receiving turns a hook-like shape $15^b$.

In this type of attachment no twist is given the wire between the ring and the end turns, but the wire is merely crossed over at 18, so that each end turn $15^b$ lies upon the opposite side of the ring centre from that on which it crossed its coacting end turn. It is thus seen that there results a considerable spring action tending to hold the hooks close to each other, and a chain ball 1 may be held in place by this force. However, I may prefer to force the hooks even closer about the chain ball in a press.

With the understanding that the forms particularly described and illustrated are given merely by way of illustration,

I claim:

A chain end comprising an end ball, a loop of wire, and turns upon the ends of said loop of diameter greater than a chain ball, said loop ends being crossed and engaging the end ball on opposite sides of the same from the sides upon which they entered the crossover.

In testimony whereof I have signed my name to this specification.

WILLIAM J. GAGNON.